(12) United States Patent
Flynn et al.

(10) Patent No.: US 9,393,573 B2
(45) Date of Patent: Jul. 19, 2016

(54) CONTINUOUS BELT FOR BELT-TYPE SEPARATOR DEVICES

(71) Applicant: SEPARATION TECHNOLOGIES, LLC, Needham, MA (US)

(72) Inventors: Kyle P. Flynn, Ashland, MA (US); Jose L. Rivera-Ortiz, Canton, MA (US); Bulent Sert, Marblehead, MA (US)

(73) Assignee: SEPARATION TECHNOLOGIES LLC, Needham, MA (US)

( * ) Notice: Subject to any disclaimer, the term of this patent is extended or adjusted under 35 U.S.C. 154(b) by 118 days.

(21) Appl. No.: 14/261,056

(22) Filed: Apr. 24, 2014

(65) Prior Publication Data

US 2015/0306605 A1  Oct. 29, 2015

(51) Int. Cl.
*B03C 7/08* (2006.01)
*B29C 69/00* (2006.01)
*B03C 7/00* (2006.01)

(52) U.S. Cl.
CPC . *B03C 7/08* (2013.01); *B03C 7/006* (2013.01); *B29C 69/001* (2013.01); *B03C 2201/20* (2013.01)

(58) Field of Classification Search
CPC .............. B03C 7/00; B03C 7/006; B03C 7/08
See application file for complete search history.

(56) References Cited

U.S. PATENT DOCUMENTS

| | | | |
|---|---|---|---|
| 1,100,896 A | 9/1914 | Comstock | |
| 1,110,896 A | 9/1914 | Comstock | |
| 1,222,305 A | 4/1917 | Kraus | |
| 1,355,477 A | 10/1920 | Howell | |
| 1,931,322 A | 10/1933 | Kepler | |
| 2,689,648 A | 9/1954 | Maestas | |
| 2,758,666 A | 8/1956 | Prentiss | |
| 2,776,725 A | 1/1957 | Wood | |
| 2,847,124 A | 8/1958 | Brastad | |
| 2,889,042 A | 6/1959 | Le Baron | |
| 3,022,889 A | 2/1962 | Le Baron et al. | |
| 3,096,277 A | 7/1963 | Maestas | |

(Continued)

FOREIGN PATENT DOCUMENTS

| | | |
|---|---|---|
| CN | 1243457 A | 2/2000 |
| DE | 0705007 C | 4/1941 |

(Continued)

OTHER PUBLICATIONS

A.R. Savkoor & T.J. Rutyer, "Experimental investigation of the effect of electrical potential on adhesive friction of elastomers", Advances in Polymer Friction & Wear, ed., L-H Lee, (Polymer Science & Technology Symposium Series, vol. 5B, PlenumPress, NY, 1974.

(Continued)

*Primary Examiner* — Joseph C Rodriguez
(74) *Attorney, Agent, or Firm* — Lando & Anastasi, LLP

(57) ABSTRACT

A belt for use in a belt separation apparatus and a method to separate a particle mixture based on tribo-electric charging of particles is disclosed. The belt is particularly suitable for tribo-electric separation of particles that tend to accumulate on the edges of the belt separation apparatus and/or tend to compound, or blend, with the belt material. The belt comprises impermeable longitudinal edges, apertures interior to the longitudinal edges of the belt, and periodic notches formed in the longitudinal edges of the belt at periodic locations in the edge of the belt.

10 Claims, 8 Drawing Sheets

(56) References Cited

U.S. PATENT DOCUMENTS

| | | | |
|---|---|---|---|
| 3,140,714 A | 7/1964 | Murphy, Jr. et al. | |
| 3,247,960 A | 4/1966 | Brastad | |
| 3,384,692 A | 5/1968 | Galt et al. | |
| 3,449,837 A | 6/1969 | Giddings | |
| 3,449,938 A | 6/1969 | Giddings | |
| 3,493,109 A | 2/1970 | Carta et al. | |
| 3,635,340 A | 1/1972 | Dunn | |
| 3,664,939 A | 5/1972 | Luner et al. | |
| 3,720,312 A | 3/1973 | Shook et al. | |
| 3,941,685 A | 3/1976 | Singewald et al. | |
| 3,988,410 A | 10/1976 | Larsen et al. | |
| 4,122,002 A | 10/1978 | Hauskins, Jr. | |
| 4,122,022 A | 10/1978 | MacKenzie et al. | |
| 4,137,156 A | 1/1979 | Morey et al. | |
| 4,172,028 A | 10/1979 | Dunn | |
| 4,211,594 A | 7/1980 | Freitag et al. | |
| 4,274,947 A | 6/1981 | Beeckmans et al. | |
| 4,297,207 A | 10/1981 | Singewald et al. | |
| 4,298,518 A | 11/1981 | Ohmura et al. | |
| 4,302,245 A | 11/1981 | Winters | |
| 4,321,189 A | 3/1982 | Ohshita et al. | |
| 4,358,358 A | 11/1982 | Rhodes | |
| 4,430,146 A | 2/1984 | Johnson | |
| 4,440,638 A | 4/1984 | Judy et al. | |
| 4,451,357 A | 5/1984 | LaVigne | |
| 4,476,004 A | 10/1984 | Pohl | |
| 4,482,351 A | 11/1984 | Kitazawa et al. | |
| 4,517,078 A | 5/1985 | Inculet et al. | |
| 4,533,447 A | 8/1985 | Meldon | |
| 4,701,487 A | 10/1987 | Hakim | |
| 4,767,506 A | 8/1988 | Fricke | |
| 4,839,032 A | 6/1989 | Whitlock | |
| 4,874,507 A | 10/1989 | Whitlock | |
| 5,006,226 A | 4/1991 | Burt, Jr. | |
| 5,135,974 A | 8/1992 | Moore | |
| 5,188,873 A | 2/1993 | Delannoy | |
| 5,251,762 A | 10/1993 | Taylor et al. | |
| 5,299,692 A | 4/1994 | Nelson et al. | |
| 5,342,250 A | 8/1994 | Sanders | |
| 5,356,682 A | 10/1994 | Stewart et al. | |
| 5,358,119 A | 10/1994 | Stahl et al. | |
| 5,447,588 A | 9/1995 | Merz et al. | |
| 5,449,390 A | 9/1995 | Duncan et al. | |
| 5,484,061 A | 1/1996 | Dunn | |
| 5,513,755 A | 5/1996 | Heavilon et al. | |
| 5,562,755 A | 10/1996 | Fricke et al. | |
| 5,562,796 A | 10/1996 | Ertel | |
| 5,698,358 A | 12/1997 | Yu | |
| 5,819,946 A | 10/1998 | Whitlock et al. | |
| 5,829,598 A | 11/1998 | Whitlock | |
| 5,837,115 A * | 11/1998 | Austin | B01J 19/0093 204/450 |
| 5,904,253 A | 5/1999 | Cerullo et al. | |
| 6,066,194 A | 5/2000 | Hugghins et al. | |
| 6,074,458 A | 6/2000 | Bittner et al. | |
| 6,375,875 B1 | 4/2002 | Paulauskas et al. | |
| 6,942,752 B2 | 9/2005 | Whitlock et al. | |
| 7,467,709 B2 * | 12/2008 | Whitlock | B03C 7/08 156/137 |
| 8,552,326 B2 | 10/2013 | MacKay et al. | |
| 2011/0289923 A1 | 12/2011 | Bittner et al. | |

FOREIGN PATENT DOCUMENTS

| | | | |
|---|---|---|---|
| DE | 3527599 A1 | 2/1987 | |
| EP | 0080729 A1 | 6/1983 | |
| EP | 0109828 A1 | 5/1984 | |
| EP | 0499138 A2 | 8/1992 | |
| FR | 940389 A | 12/1948 | |
| GB | 1039898 A | 8/1966 | |
| GB | 2001357 A | 1/1979 | |
| GB | 2013303 A | 8/1979 | |
| GB | 2139316 A | 11/1984 | |
| JP | 2001-503283 A | 3/2001 | |
| JP | 2002-177820 A | 6/2002 | |
| JP | 2007-046805 A | 2/2007 | |
| JP | 4889268 B2 | 3/2012 | |
| JP | 4889269 B2 | 3/2012 | |
| RU | 49588 U1 | 11/2005 | |
| RU | 49842 U1 | 12/2005 | |
| SU | 0495088 A1 | 12/1975 | |
| SU | 0498042 A1 | 1/1976 | |
| SU | 1007735 A1 | 3/1983 | |
| SU | 1196033 A1 | 12/1985 | |
| SU | 1475720 A1 | 4/1989 | |
| WO | 8707532 A1 | 12/1987 | |
| WO | 8909092 A1 | 10/1989 | |
| WO | 97/20633 A1 | 6/1997 | |
| WO | 2007/014402 A1 | 2/2007 | |

OTHER PUBLICATIONS

Adamson, R.J. and Kaler, K.V.I.S., "An Automated Stream Centered Dielectrophoretic System," Conference Record of the 1986 IEEE Industry Applications Society Annual Meeting Part II, Sep. 28-Oct. 3, 1986, IEEE Catalog No. 86CH2272-3, pp. 1350-1354.
Akzo Nobel "Polymer Additives", brochure, Bulletin 94-25, 1994.
Atochem Inc., Polymers Division, Facts about Rilsan p. 10 (1986).
Ausimont USA, Inc., "When Plstic Parts are Part Polymist, They're Better Parts" brochure (1985-1995).
B.J. Briscoe, C.M. Pooley and D. Tabor, in "Friction & Wear of some polymers in unlubicated sliding", Advances in Polymer Friction & Wear, ed., L-H Lee, (Polymer Science & Technology Symposium Series, vol. 5B, Plenum Press, NY, 1974.
Chemie Linz production brochure on "Melamine Cyanurate additive for Plastics".
Dow Corning Corp., "A Guide to Dow Corning Products", p. 31 (1977).
du Pont "Guide to processing Kevlar Aramid Fiber and pulp for friction products" brochure, p. 1 E-65333, Jun. 1984.
du Pont Kevlar Aramid Fiber Technical Guide brochure p. III-1 H-46267, Dec. 1992.
du Pont Teflon Fluroadditive brochure 44662, undated (but issued between 1988 and 1994).
du Pont Zytel-Kevlar SFC Short Fibert Composite Brochure H-42527, Feb. 1994.
Gachter and Muller, Plastics Additive Handbook, 3rd Edition, Haser, p. 632 (1990).
Hoechst Plastics Hostalen GUR brochure, p. 16 HKR 112 Feb. 1981.
John E. Theberge, Jane Crosby and Marygail Hutchins "Greater Property Uniormity from Aramid-Reinforced Thermoplastics, Reprint from Machine Design, Feb. 7, 1985—Reinforceds Thermoplastics".
LNP Corporation, Malvern, PA, "Lubricomp Internally Lubricated Reinforced Thermoplastics and Fluoropolymer Composites," Bulletin 254-998, undated (but probably from 1985-1990).
Lonza Plastic Additive Selection Guide, brochure BP, Sep. 1994.
Lonza spec sheet on Acrawax C (ethylene bisstearamide), revised Mar. 1993.
Notification of Transmittal of the International search Report and the Written Opinion of the International Searching Authority, or the Declaration dated Jan. 19, 2012 for PCT/US2011/050148.
Plastics Compounding magazine, 171(4), Jul./Aug. 1994, p. 22.
R.J. Gruber & P.C. Julien, "Dry Toner Technology", A.S. Diamond, ed., Handbook of Imaging Materials, Marcel Dekker, 1991.
RTP Corp, Winona, MN brochure "Wear Resistant Thermoplastics" (1991).
SME Mineral Processing Handbook-Norman L. Weiss, Pub. by Society of Mining Engineers of the American Institute of Mining, Metallurgical, andPetroleum Engineers, Inc. 1985, pp. 6-34.
Synthetic Product Company, Technical data sheet on "Petrac Slip-Pure" TD-003, rev Feb. 10, 1994.
Whitlock, D.R., "Electrostatic Separation of Unburned Carbon from Fly Ash," Proceedings Tenth Int. Ash Use Symposium, vol. 2, 1993,pp. 70-1-70-2, XP002063618.

* cited by examiner

CONTINUOUS BELT FOR BELT-TYPE SEPARATOR DEVICES

BACKGROUND

1. Field of Invention

The present invention relates to an improved belt that may be used in a belt separation apparatus to separate a particle mixture based on tribo-electric charging of the particles.

2. Discussion of Related Art

Belt separator systems (BSS) are used to separate the constituents of particle mixtures based on the charging of the different constituents by surface contact (i.e. the triboelectric effect). FIG. 1 shows a belt separator system 10 such as is disclosed in commonly-owned U.S. Pat. Nos. 4,839,032 and 4,874,507, which are hereby incorporated by reference in their entirety. One embodiment of belt separator system 10 includes parallel spaced electrodes 12 and 14/16 arranged in a longitudinal direction to define a longitudinal centerline 18, and a belt 20 traveling in the longitudinal direction between the spaced electrodes, parallel to the longitudinal centerline. The belt 20 forms a continuous loop which is driven by a pair of end rollers 22, 24. A particle mixture is loaded onto the belt 20 at a feed area 26 between electrodes 14 and 16. Belt 20 includes counter-current traveling belt segments 28 and 30 moving in opposite directions for transporting the constituents of the particle mixture along the lengths of the electrodes 12 and 14/16. The only moving part of the BSS is the belt 20. The belt is therefore a critical component of the BSS. The belt 20 moves at a high speed, for example, about 40 miles an hour, in an extremely abrasive environment. The two belt segments 28, 30 move in opposite directions, parallel to centerline 18, and thus if they come into contact, the relative velocity is about 80 miles an hour.

Related art belts were previously woven of abrasion resistant 45 monofilament materials. These belts were quite expensive and lasted only about 5 hours. The mode of failure was typically longitudinal wear stripes due to longitudinal wrinkling, that would wear longitudinal holes in the belt such that it would fall apart and catch on itself. The strands would also wear where they crossed and flexed in moving through the separator. The Applicant has made attempts to improve such belts with different materials and different weaves in an attempt to find a woven material with a longer life. These attempts were unsuccessful.

An improvement over woven belts for BSS were belts made of extruded materials, which have better wear resistance than woven belts and may last on the order of about 20 hours in a BSS. An example of such extruded belts is described in commonly-owned U.S. Pat. No. 5,819,946 entitled "Separation System Belt Construction," which is herein incorporated by reference. Referring to FIG. 2, there is illustrated a schematic drawing of a section of an extruded belt 40. Control of the geometry of extruded belts is desirable, but can be difficult to achieve with extruded belts.

One extruded belt that has been used in BSS is described in commonly-owned U.S. Pat. No. 5,904,253, which is also herein incorporated by reference. Referring to FIG. 3, which illustrates an enlarged portion of the BSS shown in FIG. 1, the directions of the counter-travelling belt segments 28, 30 are shown by arrows 34 and 36, respectively. As illustrated in FIG. 2-3, one example of a desired belt 40 geometry (See FIG. 3) has a leading edge 43 of the belt 40 (See FIG. 2) of the cross direction strands 46 is provided with an acute angle 44.

To improve the life of the extruded belt and to gain better control of the geometry of the belt profiles discussed in U.S. Pat. No. 5,904,253, a method of joining abrasion resistant thermoplastic sheets as described in commonly-owned U.S. Pat. No. 6,942,752, herein incorporated by reference, has been used to produce belts from ultra high molecular weight polyethylene (UHMWPE) sheets. One example of a convenient method for forming the holes and leading edge and trailing edge features of a desired geometry in such UHMWPE sheets is to use a multi-axis machine tool. With this device, a sheet is loaded onto a table and a cutter head is moved across the sheet and each opening in the belt may be cut individually. Through the proper choice of cutting tool, the holes can be cut with leading edge and trailing edge features as desired. It is also to be appreciated that the desired leading edge geometry can be obtained through other forming processes and devices such as molding, punching, machining, water jet cutting, laser cutting, and the like.

SUMMARY OF INVENTION

Aspects and embodiments are directed to an improved belt that may be used in a belt separation apparatus to separate a particle mixture based on tribo-electric charging of the particles, and more specifically to an improved belt having notches in each impermeable longitudinal edge. The improved belt is particularly suitable for tribo-electric separation of particles that tend to accumulate on the edges of the belt separation apparatus and/or tend to compound, or blend, with the belt material.

One embodiment of a continuous belt for use in a belt separator system for separating components of a difficult-to-fluidize material comprises impermeable longitudinal edges, apertures interior to the longitudinal edges of the belt, and periodic notches formed in the longitudinal edges of the belt at periodic locations in the edge of the belt.

According to aspects of this embodiment, the apertures are configured to be permeable to the components of the difficult-to-fluidize material. According to aspects of this embodiment, the notches are configured for conveying the components of the difficult-to-fluidize material in a direction along the longitudinal direction of the belt and away from the edges of the belt separation system. According to aspects of this embodiment, the notches are formed in the longitudinal edge of the belt have a beveled edge. According to aspects of this embodiment, the bevel edge of each notch has a radius in a range of 4-5 mm. According to aspects of this embodiment, the notches formed in the longitudinal edge of the belt have a triangular-shape. According to aspects of this embodiment, the notches have an opening length is in the range of 19 mm-400 mm. According to aspects of this embodiment, the notches have an opening depth is in the range of 13 mm-31 mm. According to aspects of this embodiment, the notches have a spacing is in the range of 63 mm-960 mm. According to aspects of this embodiment, a leading edge of the notch has an angle in a range from 12-45° with respect to the longitudinal edge. According to aspects of this embodiment, a trailing edge of the notch is perpendicular with respect to the longitudinal edge. According to aspects of this embodiment, the notches in the longitudinal edges have dimensions selected to maximize throughput of a belt separator system for a difficult-to-fluidize material. According to aspects of this embodiment, the notches in the longitudinal edges have dimensions selected to minimize frictional heating of the belt longitudinal edge strands. According to aspects of this embodiment, the notches in the longitudinal edges have dimensions selected to maximize an operating lifetime of the belt for a difficult-to-fluidize material. According to aspects of this embodiment, the belt has a width a few mm less than a width of the inside of the belt separator system.

One embodiment of a method of making a continuous belt for use in a belt separator system for separating components of a difficult-to-fluidize material, comprises forming a continuous belt with impermeable longitudinal edges, forming apertures interior to the longitudinal edges of the belt that are configured to be permeable to the components of the difficult-to-fluidize material, and forming periodic notches in the longitudinal edges of the belt at periodic locations in the edge of the belt.

According to aspects of this embodiment, the apertures are configured for conveying the components of the difficult-to-fluidize material in a direction along the longitudinal direction of the belt. According to aspects of this embodiment, the notches are formed in the longitudinal edge of the belt with a beveled edge. According to aspects of this embodiment, the beveled edge of each notch with is formed with a radius in a range of 4-5 mm. According to aspects of this embodiment, the notches are formed in the longitudinal edges of the belt with a triangular-shape. According to aspects of this embodiment, the notches are formed in the longitudinal edges of the belt with a leading edge having an angle in a range from 12-45° with respect to the longitudinal edge. According to aspects of this embodiment, the notches are formed in the longitudinal edges of the belt with a trailing edge of the notch being perpendicular with respect to the longitudinal edge. According to aspects of this embodiment, the notches are formed in the longitudinal edges of the belt with dimensions selected to maximize throughput of a belt separator system for a difficult-to-fluidize material. According to aspects of this embodiment, the notches are formed in the longitudinal edges of the belt with dimensions selected to maximize an operating lifetime of the belt for a difficult-to-fluidize material. According to aspects of this embodiment, the belt width is formed with a width that is a few mm short of a width of an inside of the belt separator system. According to aspects of this embodiment, the continuous belt is formed by any of extruding, molding, punching, machining, water jet cutting, and laser cutting. According to aspects of this embodiment, the notches in the longitudinal edges of the belt are formed by any of extruding, molding, punching, machining, water jet cutting, and laser cutting.

One embodiment of a continuous belt for use in a belt separator system for separating components of a difficult-to-fluidize material comprises a first electrode and a second electrode arranged on opposite sides of a longitudinal centerline and configured to provide an electric field between the first and second electrodes, a continuous belt having impermeable longitudinal edges and apertures interior to the longitudinal edges that are permeable to the components of the difficult-to-fluidize material, and having periodic notches formed within the longitudinal edges at periodic locations in the edge of the belt.

According to aspects of this embodiment, the apertures are configured for conveying components of the difficult-to-fluidize material having like net influenceability to the electric field in respective counter-current streams along the longitudinal direction between the first and second electrodes. According to aspects of this embodiment, the notches are configured for conveying the components of the difficult-to-fluidize material in a direction along the longitudinal direction of the belt separator system. According to aspects of this embodiment, the notches formed in the longitudinal edge of the belt have a beveled edge. According to aspects of this embodiment, the bevel edge of each notch has a radius in a range of 4-5 mm. According to aspects of this embodiment, the notches formed in the longitudinal edge of the belt have a triangular-shape. According to aspects of this embodiment, a leading edge of the notch has an angle in a range from 12-45° with respect to the longitudinal edge. According to aspects of this embodiment, a trailing edge of the notch is perpendicular with respect to the longitudinal edge. According to aspects of this embodiment, the belt includes counter-current belt segments traveling in opposite directions along the longitudinal direction. According to aspects of this embodiment, the notches in the longitudinal edges have dimensions selected to maximize throughput of the belt separator system for a difficult-to-fluidize material. According to aspects of this embodiment, the notch in the longitudinal edge has dimensions selected to maximize an operating lifetime of the belt for a difficult-to-fluidize material. According to aspects of this embodiment, the belt has a width a few mm short of a width of the inside of the belt separator system and the edges in the longitudinal edges of the belt are configured to sweep components of the difficult-to-fluidize material away from the inside edge of the separation system.

One embodiment of a method of separating components of a difficult-to-fluidize material with a separation chamber having an elongated dimension that is long compared to a spacing between a pair of opposing electrode surfaces, comprises providing an electric field being between the opposing electrode surfaces, conveying the components of the difficult-to-fluidize material in two streams in opposite directions between the opposing electrode surfaces with a continuous conveying belt having impermeable longitudinal edges and apertures interior to the impermeable longitudinal edges that are permeable to the components of difficult-to-fluidize material, and conveying the components of the difficult-to-fluidize material away from interior longitudinal sides of the separation chamber with notches periodically disposed in the longitudinal edges.

According to aspects of this embodiment, the notches are configured to convey the mixture of particles in a direction parallel to the opposing electrode surfaces. According to aspects of this embodiment, the notches in the longitudinal edges of the belt are configured to sweep an inside surface of the longitudinal edges of the separation chamber. According to aspects of this embodiment, the notches in the longitudinal edges of the belt have a beveled edge. According to aspects of this embodiment, the notches in the longitudinal edges of the belt have a radius in a range of 4-5 mm. According to aspects of this embodiment, the notches in the longitudinal edges of the belt have a triangular-shape. According to aspects of this embodiment, the notches in the longitudinal edges of the belt have a leading edge having an angle in a range from 12-45° with respect to the longitudinal edge. According to aspects of this embodiment, the notches in the longitudinal edges of the belt have a trailing edge that is perpendicular with respect to the longitudinal edge. According to aspects of this embodiment, the notches in the longitudinal edges of the belt have dimensions selected to maximize throughput of the belt separator system for a difficult-to-fluidize material. According to aspects of this embodiment, the notches in the longitudinal edges of the belt have dimensions selected to maximize an operating lifetime of the belt for a difficult-to-fluidize material.

One embodiment of a method of separating different components of a difficult-to-fluidize material in a separation chamber comprises admitting the difficult-to-fluidize material into the separation chamber having confronting surfaces spaced more closely than respective lengths of the confronting surfaces, impressing a separation influence toward at least one of the confronting surfaces of the separation chamber, separating the different components of the difficult-to-fluidize material in the direction of the separation influence according to their relative influenceability to the separation influence, mechanically moving the components of like net influenceability of the difficult-to-fluidize material near each other in streams moving transversely to the separation influence along the longitudinal direction between the first and second electrodes, the streams being in communication parallel to the separation influence so as to transfer a portion of at least one of the streams to another of the streams by virtue of the continued action of the separation influence as the streams progress transversely to the separation influence; and removing separated streams of the difficult-to-fluidize material from the separation chamber. The components of like net influenceability of the difficult-to-fluidize material are mechanically moved by the continuous belt having impermeable longitudinal edges of a predefined width and apertures interior to the longitudinal edges that are permeable to the components of the difficult-to-fluidize material, and periodic notches formed within the longitudinal edges at periodic locations in the edge of the belt.

According to aspects of this embodiment, the notches are configured for conveying the components of streams of the difficult-to-fluidize material in a direction along the longitudinal direction of the belt separator system. According to aspects of this embodiment, an inside surface of the longitudinal edges of the separation chamber is swept with the longitudinal edges including the notches of continuous belt. According to aspects of this embodiment, the notches in the longitudinal edges of the belt have a beveled edge. According to aspects of this embodiment, the notches in the longitudinal edges of the belt have a radius in a range of 4-5 mm. According to aspects of this embodiment, the notches in the longitudinal edges of the belt have a triangular-shape. According to aspects of this embodiment, the notches in the longitudinal edges of the belt have a leading edge having an angle in a range from 12-45° with respect to the longitudinal edge. According to aspects of this embodiment, the notches in the longitudinal edges of the belt have a trailing edge of the notch perpendicular with respect to the longitudinal edge. According to aspects of this embodiment, the notches in the longitudinal edges of the belt have dimensions selected to maximize throughput of the belt separator system for a difficult-to-fluidize material. According to aspects of this embodiment, the notches in the longitudinal edges of the belt have dimensions selected to maximize an operating lifetime of the belt for a difficult-to-fluidize material. According to aspects of this embodiment, the components of the streams of the difficult-to-fluidize material are moved by the apertures in the interior region of the belt and by notches in the longitudinal edge of the belt toward the longitudinal centerline of the belt separator system and away from the first and second electrodes and away from the edges of the separation chamber.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures and description. In the figures, each identical or nearly identical component that is illustrated in various figures is represented by a like numeral. For purposes of clarity, not every component may be labeled in every figure. In the figures:

DETAILED DESCRIPTION

Aspects and embodiments are directed to an improved belt that may be used in a belt separation apparatus to separate a particle mixture based on tribo-electric charging of the particles, and more specifically to an improved belt having notches in each impermeable longitudinal edge. The improved belt is particularly suitable for tribo-electric separation of particles that tend to accumulate on the edges of the belt separation apparatus and/or tend to compound, or blend, with the belt material. The improved belt also results in an improved separation process, improved belt lifetime, reduced failure of the belt and less down time for the separation apparatus.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Figure 4:
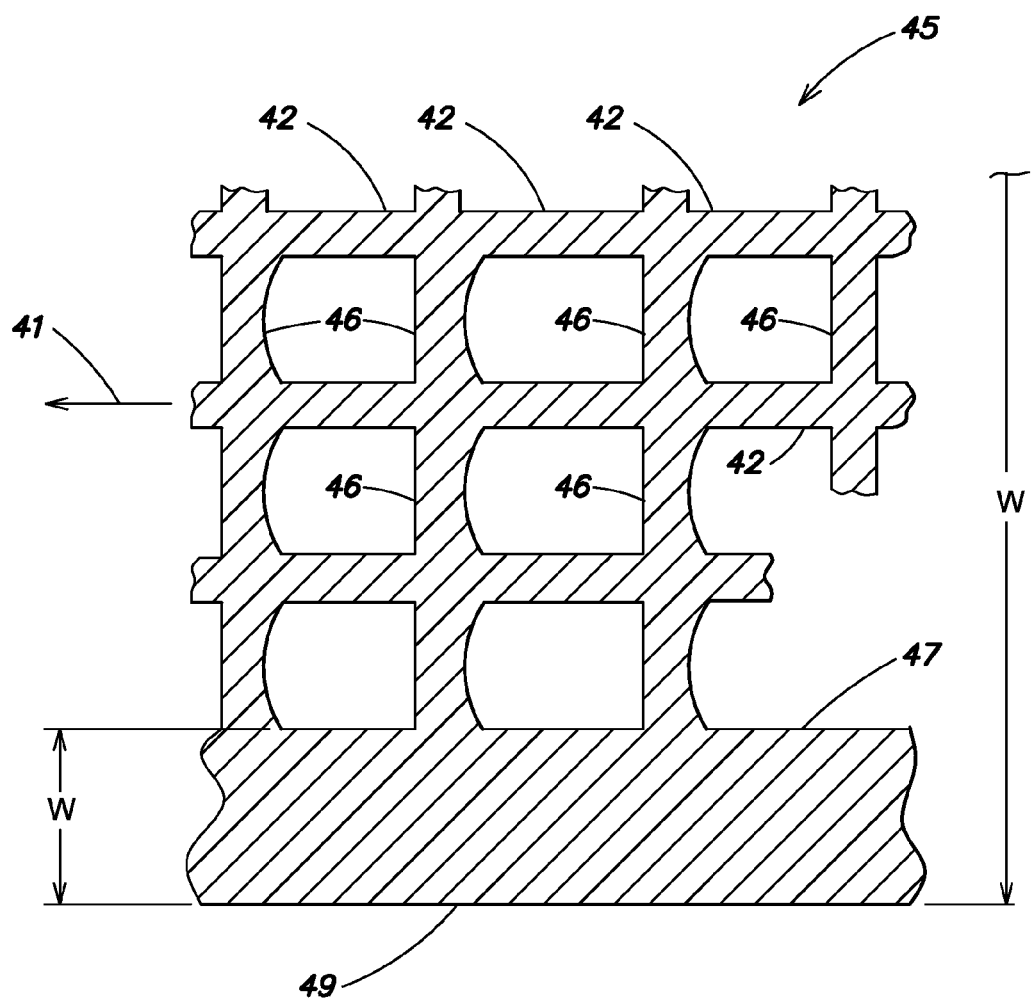
FIG. 4 illustrates a plan view of an extruded belt.

Referring to FIG. 4, one current design of a UHMWPE belt 45 has straight and smooth machine direction edge strands 47 that are thicker than the machine direction strands 42 or the cross direction strands 46 in the interior of the belt. These wider (20-30 mm) edge strands 47 serve to carry more of the tension load, provide dimensional stability and reduce the incidence of belt failure by edge 49 abrasion.

Figure 2:
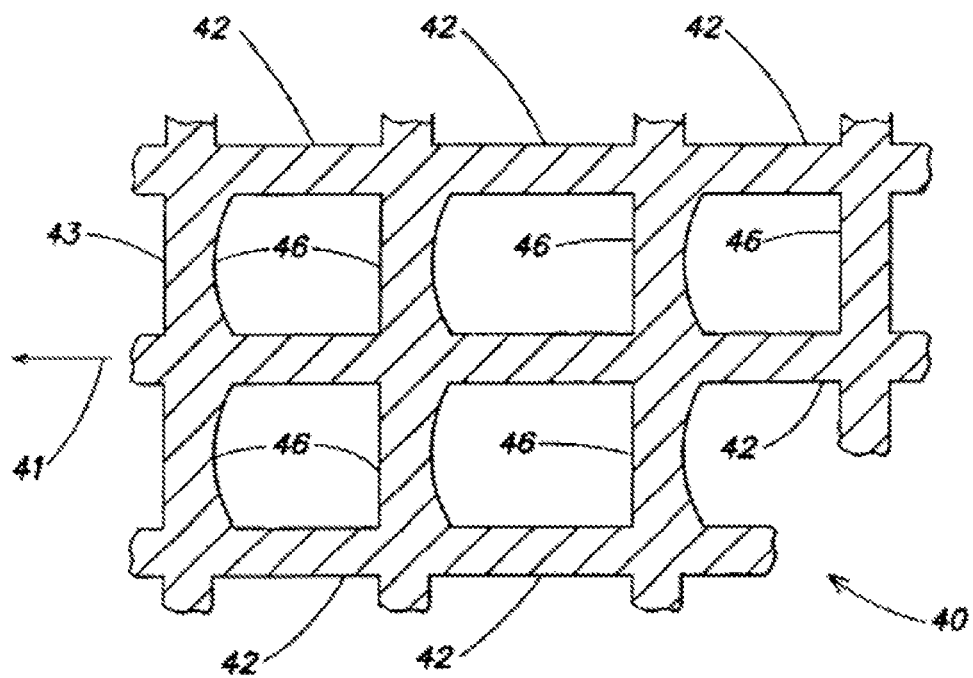
FIG. 2 illustrates a plan view of an extruded belt
Figure 3:
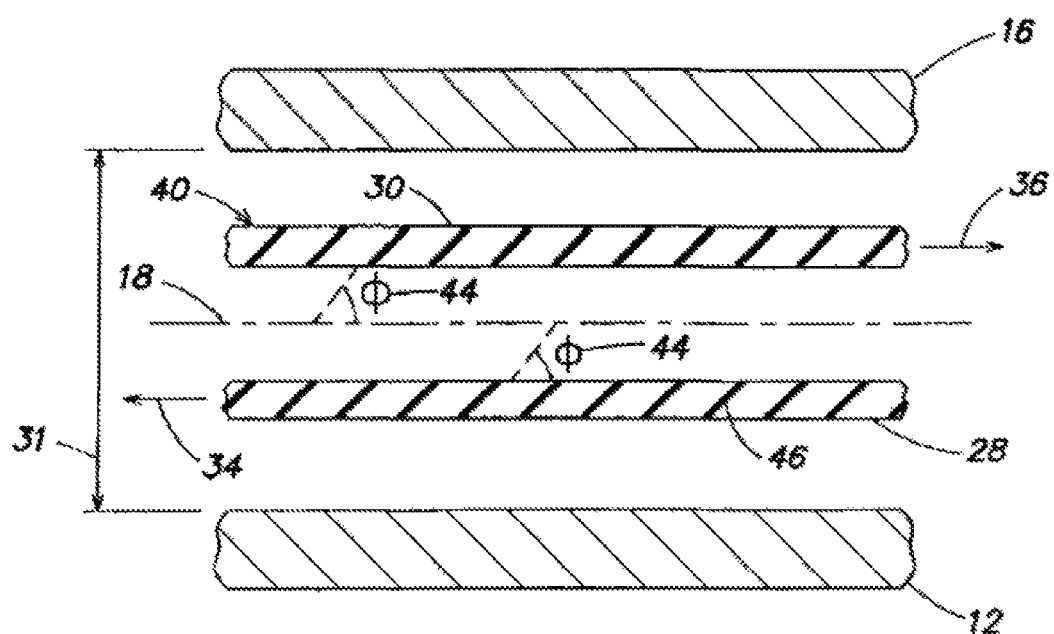
FIG. 3 illustrates an enlarged view of portion of current belt and BSS

These UHMWPE sheet belts 45 have proven to have much longer life than the aforementioned extruded belts (See FIG. 2). In certain applications, such as the separation of unburned carbon from coal combustion fly ash, these UMHWPE belts have had been tested and shown to have a maximum life of up to 1950 hours before failure.

The fluidization characteristic of powders is one parameter in determining how the particles of the powder are conveyed and separated in a BSS. Section 3.5 in Pnuematic Conveying of Solids by Klinzig G. E. et al., second edition 1997, describes materials loosely as "fluidizable" or "difficult to fluidize". This property is qualitatively assessed by the behavior of the material in a fluidized bed. The fluidization property of powders is generally accepted to be influenced by the powder particle size, specific gravity, particle shape, surface moisture, and by other less well understood properties. Coal combustion fly ash is an example of an easily fluidizable powder. Many other industrial mineral powders are more difficult to fluidize than fly ash.

The embodiment of the BSS with a continuous counter current belt moving between two longitudinal, parallel planar electrodes has inside edges of the separation chamber that are not directly swept by the belt 45. It is desirable to minimize the area of the unswept zone of the edges of the separation chamber, since it represents electrode area that is not effective for particle separation. However, it is also typical to leave a gap between the edge 47 of the belt 45 and the inside edge of the separation chamber to prevent the belt from rubbing and wearing against the inside edge of the separation chamber, which could lead to early belt failure. Therefore the width w (See FIG. 4) of the belt 45 is approximately 20 mm narrower than the width of the separation chamber, in order to leave about 10 mm clearance between the inside wall of the separation chamber and the edges 47 of the belt 45.

Fluidizable powders, such as coal combustion fly ash, are effectively swept from the inside edges of the separation chamber by the motion of the belt 45. This occurs because the motion of the belt 45 creates a shear force which exceeds the inter-particle forces between particles of the coal combustion flyash and between particles of the combustion flyash and the edge walls of the separation chamber. However, for "difficult to fluidize" or more cohesive powders, such as many industrial minerals, the shear force generated by the moving belt 45 is not typically sufficient to overcome the interparticle forces in the powder, which results in a build-up of compacted, thermally insulating, abrasive powder on the inside edge of the separation chamber in the zone between the inside wall of the separation chamber and the edges 47 of the belt 45 that the belt 45 does not sweep.

Such non-fluidized abrasive powder that can also become trapped, or sandwiched, between the machine direction edge strands 42 of the top section of the belt 30 and the bottom section of the belt 28 (See FIG. 2) which are moving in opposite directions at relative velocities from 20 to 100 ft/sec. The abrasion between the moving belt segments, enhanced by the non-fluidized abrasive powder, leads to small fragments of UHMWPE belt being removed from the belt and frictional heating of the edge strands 47 over their width and along their length. At these elevated temperatures, the small fragments of plastic belt material and the powder tend to fuse together to form composites of powder and plastic, which can grow to 10-200 mm in length and 5-25 mm wide. With the edge of the belt 47 now running against these plastic-powder compound deposits, they cause further frictional heating and eventually destroy the edge of the belt, sometimes even fusing the belt strands together. The composition of a typical thermoplastic-powder composite that was retrieved from a belt failure caused by the buildup of this composite residue has been measured as approximately 50% thermoplastic and 50% industrial mineral powder. This phenomenon of plastic powder composite buildup and accumulation on the unswept edges 47 of the BSS separation chamber has led to extremely short belt life in the range of tens of hours for the BSS when processing some industrial minerals (particularly non-fluidized materials).

Figure 5A:
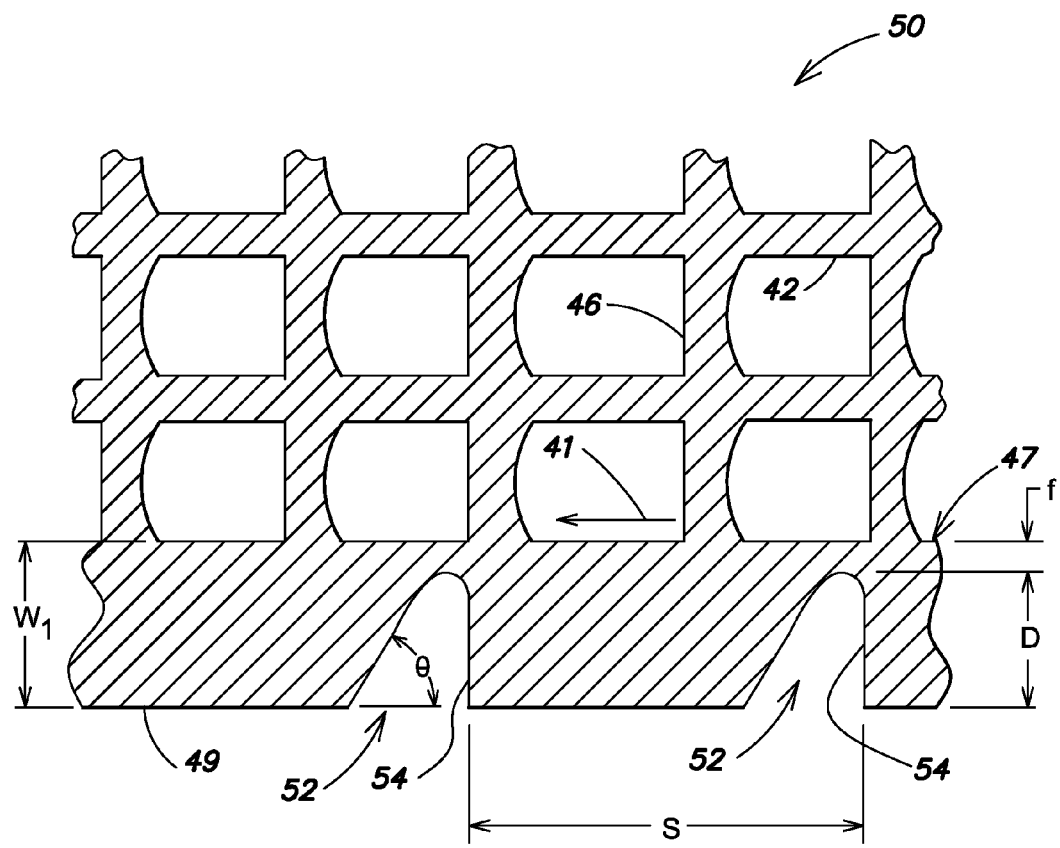
FIG. 5A illustrates an enlarged plan view of a belt edge with a triangular edge notch that is beveled and with blanked hole adjacent to notch.

Referring to FIG. 5A, there is illustrated a plan view of an improved belt for a BSS, particularly for processing and separating some industrial materials (particularly non-fluidized materials). To improve belt life when processing "difficult to fluidize" particles using a BSS, the improved belt design 50 has been provided with continuous (having a width w1 of 20-30 mm wide) edge strands 47 on each side of the belt (only one side of the belt is illustrated), which have been modified by creating open notches 52 of a prescribed shape and location. These notches 52 can be obtained through various forming means such as molding, punching, machining, water jet cutting, laser cutting, and the like.

Figure 1:
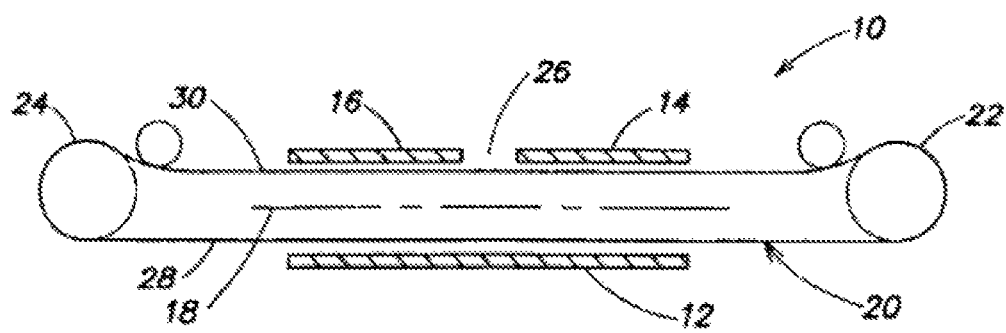
FIG. 1 illustrates a diagram of one example of belt separator system (BSS)
Figure 5B:
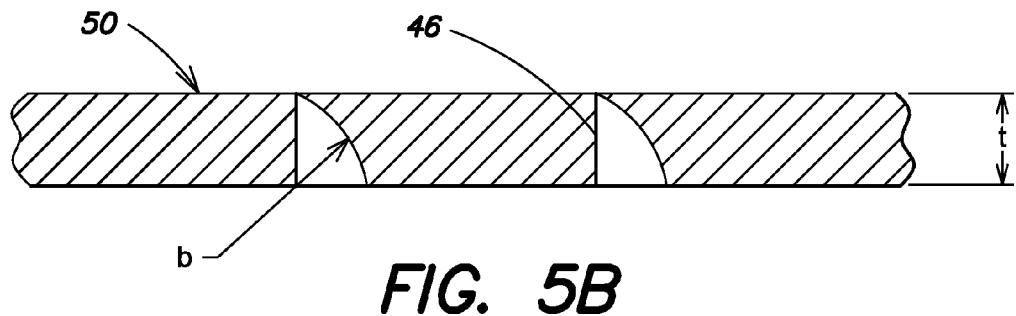
FIG. 5B illustrates an side view of the belt of FIG. 5A.

The edge notches 52 provide a mechanism, pathway and conveying mechanism for powder sandwiched between edge strands 47 of oppositely moving belt segments 28, 30 to convey the particles of powder in either direction of belt motion. It is to be appreciated that the removal of stagnant powder between the edge strands 47 of oppositely moving belt segments 28, 30 significantly reduces abrasion and frictional heating. This belt 50 having such edge notches 52 has been tested in existing BSS of FIG. 1, and it has been shown that the use of belts with notched edges 52 has eliminated the formation of the plastic-powder composite build-up material that has historically resulted in short belt file. This belt 50 having such edge notches 52 has been tested in existing BSS of FIG. 1, and it has been shown that the belt life for has increased to 100's of hours when processing "difficult to fluidize" industrial mineral powders. This compares to belt life in the 10's of hours for prior art extruded belts having straight edge strands 47 without any notches, such as shown in FIG. 4. The trailing edge 54 of the notch 52 perpendicular to the edge of the belt 49 and the direction the belt is moving 41 provides a motive force to move powder in the direction of the belt motion. The volume of the notch 52, which is determined by depth of notch D, length of notch L, angle Ø, and thickness t of the belt (See FIG. 5B), provides the carrying capacity of each notch 52. The spacing between notches (S) determines the carrying capacity of the belt per unit belt length of the belt. FIG. 5B illustrates a side view of the belt 50 and the notch 52, and in particular illustrates that the edges of the notch, such as the trailing edge 46, can be provided we a bevel having a bevel radius of b.

Example 1

In one example, separator belts 45 illustrated in FIG. 4 containing no notches 52 and a continuous, unbroken, straight edge geometry 47 with a width (w) of 25 mm was operated in a belt type electrostatic separator system (BSS) while processing ground calcium carbonate material, a difficult to fluidize powder. These belts failed due to edge deposit compounding after a maximum of 15 hours of total operation. Belts 50 of FIG. 5 containing triangular shaped edge notches 52 were operated on the same difficult to fluidize mineral powder. Belts containing the triangular-shaped edge notches 52 operated 20 times longer than the belt 45 without the edge notches, and very rarely failed due to edge deposits. Only 1 edge deposit failure was observed out of 21 belts 50 operated with edge notches 52. This significant increase in operating life of the separator belt 50 is advantageous for reducing costs when operating a BSS. The dimensions of the belts used in this example are listed below with dimensions referenced to FIG. 4.

| Feature | Dimensions (ref. FIG. 5) | No Edge Notches (ref. FIG. 4) | With Triangular Edge Notches |
|---|---|---|---|
| Thickness | t | 3-4 mm | 3-4 mm |
| Edge Width (W) | D + f | 25 mm | 25 mm |
| Notch Opening | L | N/A | 33 mm |
| Notch Spacing | S | N/A | 100 mm |
| Notch Depth | D | N/A | 19 mm |
| Solid Width | f | 25 mm | 6 mm |
| Notch Angle | Ø | N/A | 45 degrees |
| Bevel Radius | b | N/A | 4-5 mm |
| Ultimate Belt Failure Mode | | 4 - Edge Compounding | 20 - Not Edge Compounding 1 - Edge Compounding |
| Highest Belt Life | | 15 hours | 300 hours |

Example 2

Figure 6:
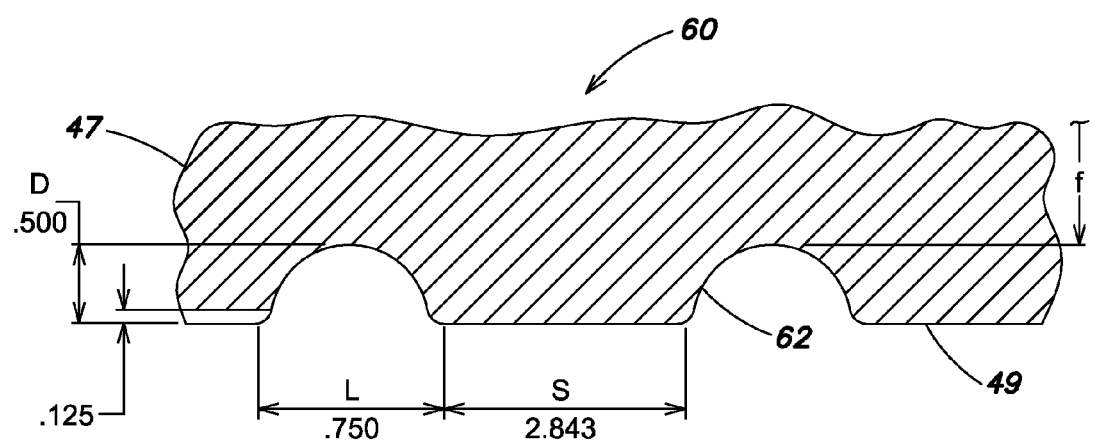
FIG. 6. illustrates an enlarged plan view of a belt with a semi-circular edge notch.

FIG. 6 illustrates another example of a improved belt 60 having beveled belt edge notches 62 cut with a semi-circular pattern into edge 49 of the separator belt edge strand 47 with a standard edge thickness of 25 mm. (FIG. 5) The semi-circular notches were cut with a smaller notch depth (D) than the notches described in example 1, but the belt and notches were still effective in preventing the edge buildup of the same difficult to fluidize powder that has been observed with belts without notches. The Belt Life of this embodiment was not as good at the belt life of the belt with the triangular-shaped notches as of Example 1. Thus, it is apparent from this Example 2 and Example 1, that a variety of edge notch configurations or shapes can be utilized to prevent edge deposit compounding, and that the shape of notch affects the improvement in the belt life. The optimum notch dimensions for a particular powder can be determined empirically by testing various belt notch designs.

| Feature | Dimensions (ref. FIG. 6) | No Edge Notches (ref. FIG. 4) | Semi-Circular Notches |
|---|---|---|---|
| Thickness | t | 3-4 mm | 3-4 mm |
| Edge Width (W) | D + f | 25 mm | 25-44 mm |
| Notch Opening | L | N/A | 19 mm |
| Notch Spacing | S | N/A | 63 mm |
| Notch Depth | D | N/A | 13 mm |
| Solid Width | f | 25 mm | 12-31 mm |
| Notch Radius | r | N/A | 13 mm |
| Ultimate Belt Failure Mode | | 4 - Edge Compounding | 2 - Not Edge Compounding |
| Highest Belt Life | | 15 hours | 96 hours |

Example 3

Figure 7:
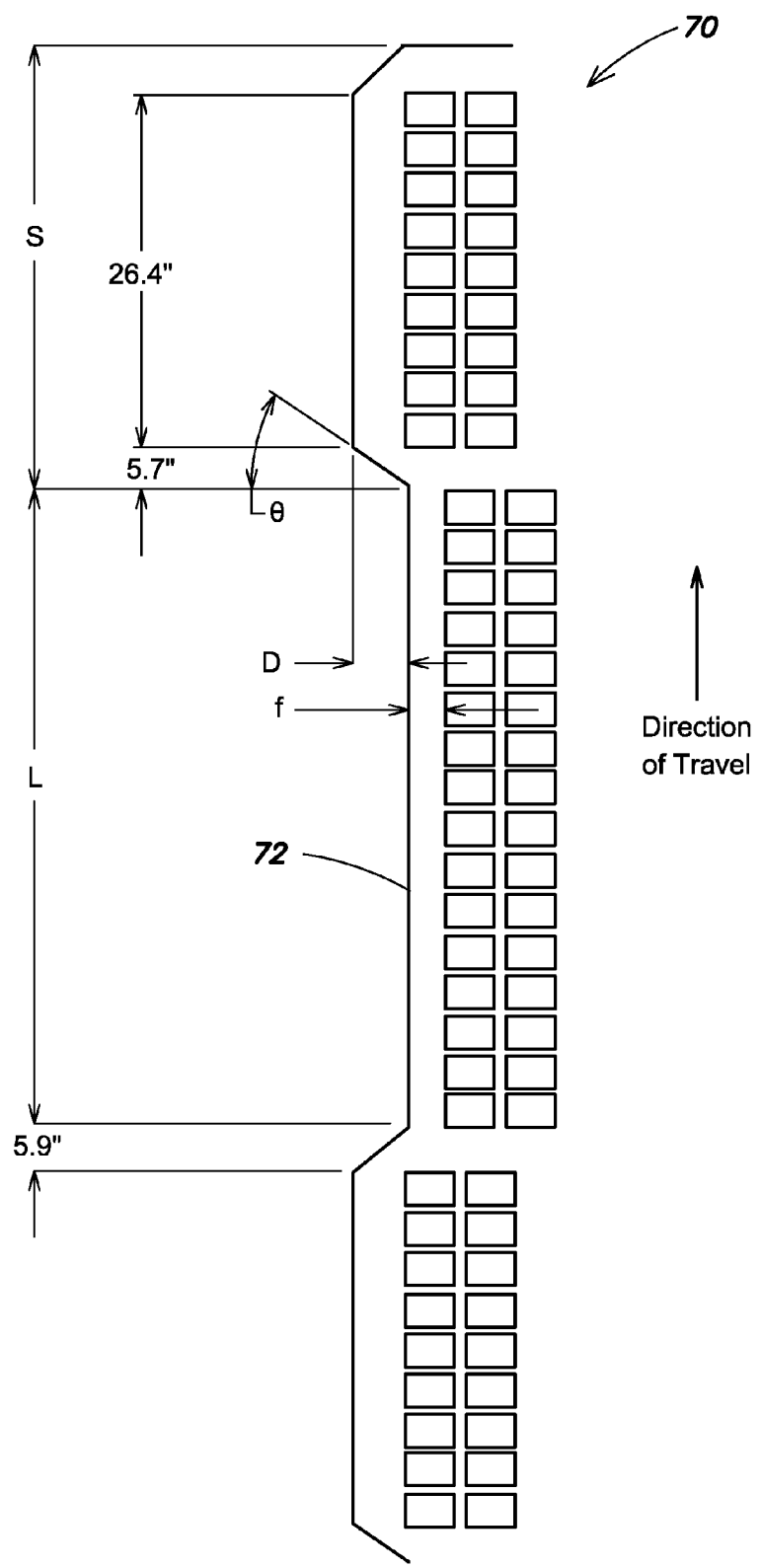
FIG. 7. illustrates an enlarged plan view of a belt edge with a long, extended edge notch.

FIG. 7 illustrates another example of a belt 70, wherein the notch geometry was varied by cutting a large continuous notch 72 of length (L) of 700 mm, with beveled edges to avoid a damaging catch of the belt notch against a belt notch travelling in the opposing direction (FIG. 7). This belt was operated while processing ground calcium carbonate material, a difficult to fluidize powder, during which time no evidence of edge deposits or compounding was observed. From this example it is evident that notches with different lengths are effective in preventing edge deposit compounding. The optimum notch dimensions for a particular powder can be determined empirically by testing various belt notch designs.

| Feature | Dimensions (ref. FIG. 7) | No Edge Notches (ref. FIG. 4) | Extended Length Notches |
|---|---|---|---|
| Thickness | t | 3-4 mm | 3-4 mm |
| Notch Opening | L | N/A | 400 mm |
| Notch Spacing | S | N/A | 960 mm |
| Notch Depth | D | N/A | 31 mm |
| Solid Width | f | 25 mm | 25 mm |
| Notch Angle | Ø | N/A | 12 degrees |
| Bevel Radius | b | N/A | 4-5 mm |
| Ultimate Belt Failure Mode | | 4 - Edge Compounding | 1 - Not Edge Compounding |
| Highest Belt Life | | 15 hours | 93 hours |

Example 4

Figure 8:
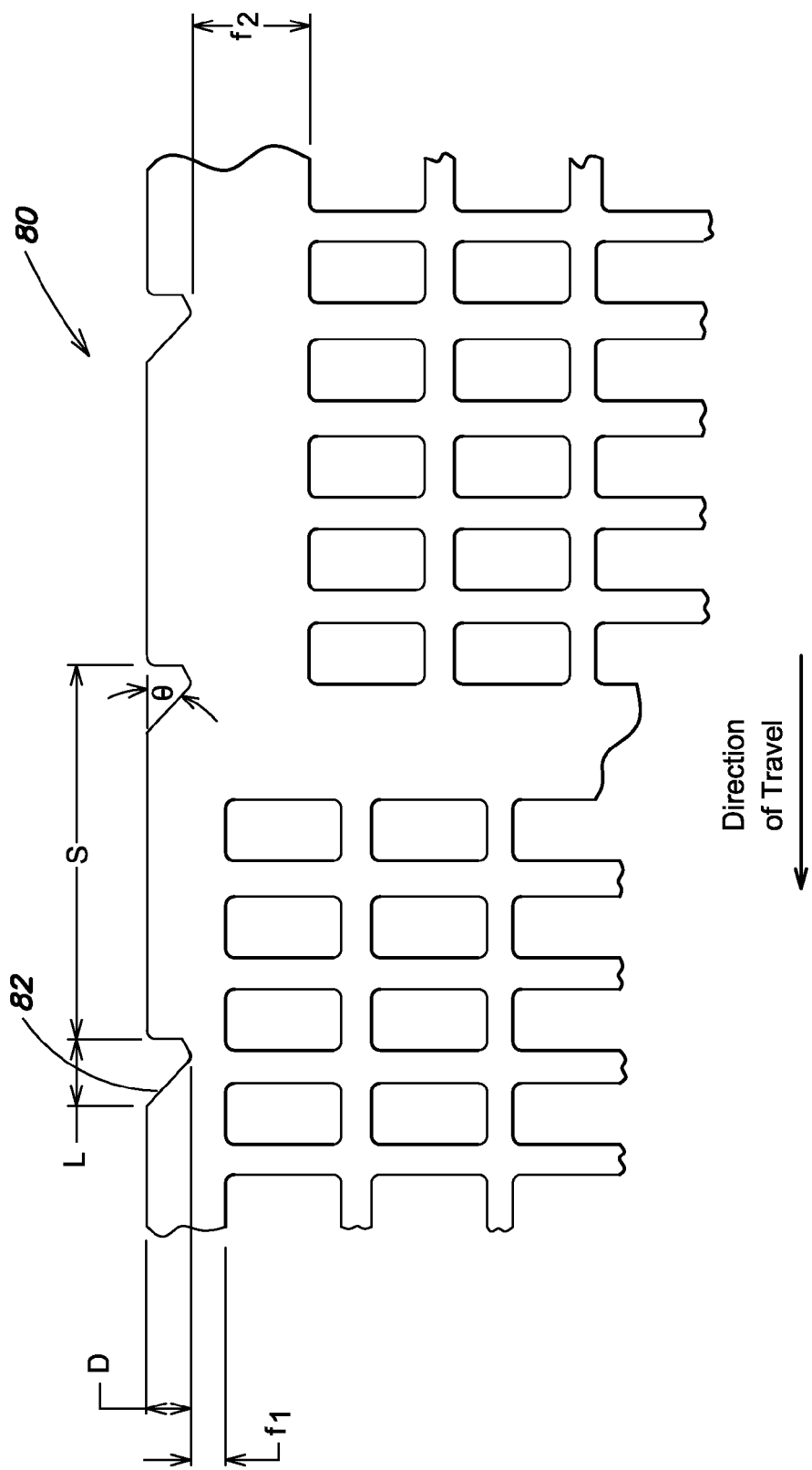
FIG. 8. illustrates an enlarged plan view of a belt edge illustrating edge notch spacing.
Figure 9:
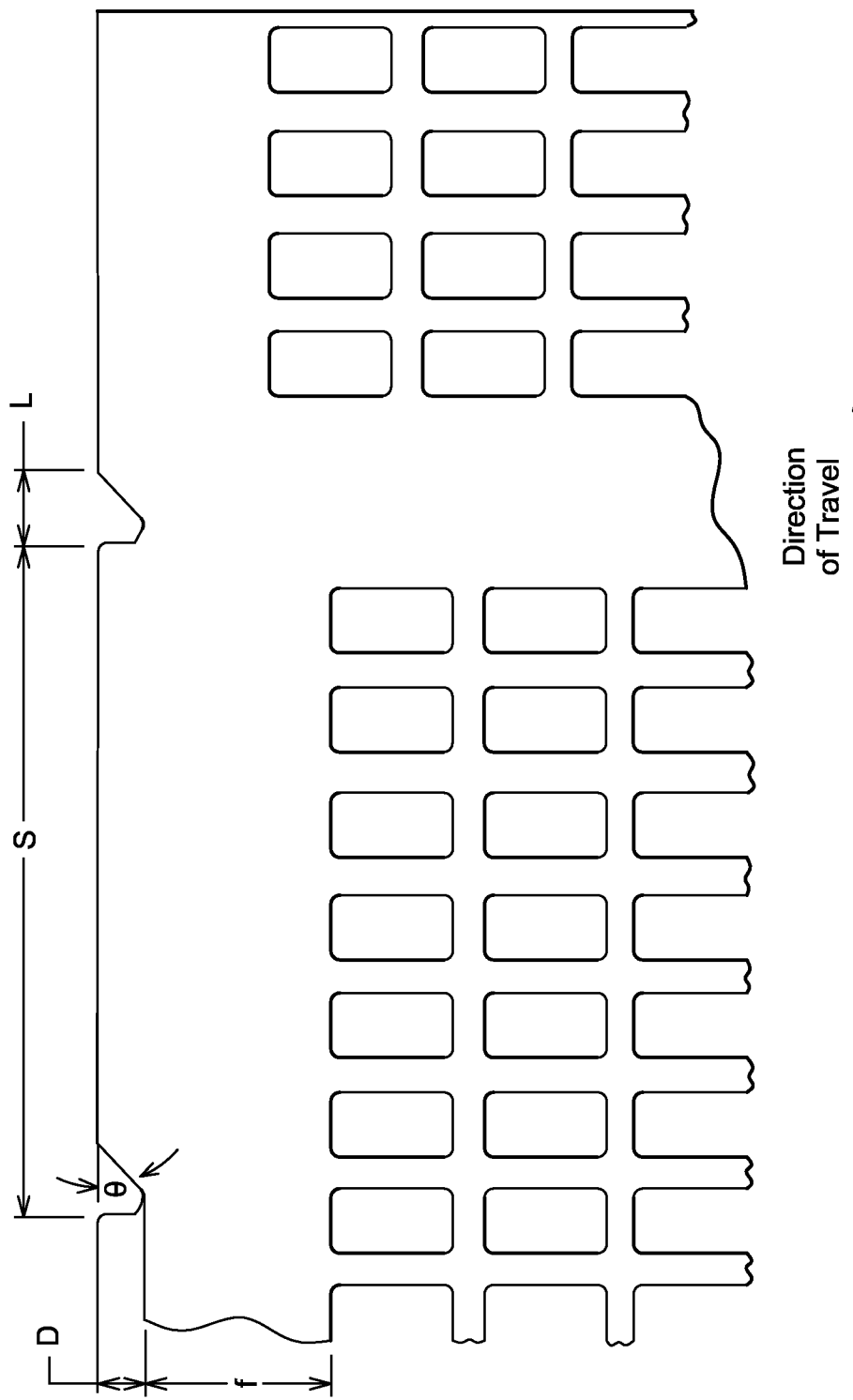
FIG. 9. illustrates an enlarged plan view of a belt edge having different edge notch spacing.

FIG. 8 illustrates another example of a belt 80, for which the spacing (S) of the notches was investigated by varying the frequency and location of triangular-shaped belt notches 82 along the length of the belt. Notches with length (L) 33 mm and spacing (S) of 100 mm were cut into the side of several belts in an uninterrupted pattern. Notches of the same geometry were cut into a second set of belts in a repeating pattern of a notched section and a straight sidewall section with 4 notches of length (L) 33 mm and spacing (S) of 183 mm into a 730 mm long section, followed by an 820 mm long section of belt containing no notches (See FIG. 9). This pattern was repeated throughout the length of the entire belt. From this example it is evident belts with increased spacing between notches are effective in preventing edge deposit compounding. The optimum notch spacing for a particular powder can be determined empirically by testing various belt notch designs.

| Feature | Dimensions (ref. FIG. 8) | No Edge Notches (ref. FIG. 4) | Notches Spaced Every 100 mm (FIG. 8) | Notches in Alternating Sections Increased Spacing (FIG. 9) |
|---|---|---|---|---|
| Thickness | t | 3-4 mm | 3-4 mm | 3-4 mm |
| Edge Width (W) | D + f | 25 mm | 22-44 mm | 25 mm |
| Notch Opening | L | N/A | 19 mm | 30 mm |

-continued

| Feature | Dimensions (ref. FIG. 8) | No Edge Notches (ref. FIG. 4) | Notches Spaced Every 100 mm (FIG. 8) | Notches in Alternating Sections Increased Spacing (FIG. 9) |
|---|---|---|---|---|
| Effective Notch Spacing | S | N/A | 100 mm | 388 mm |
| Notch Depth | D | N/A | 11 mm | 17 mm |
| Solid Width | f | 25 mm | 10-32 mm | 21 mm |
| Notch Angle | Ø | N/A | 45 deg | 45 deg |
| Bevel Radius | b | N/A | 4-5 mm | 4-5 mm |
| Ultimate Belt Failure Mode | | 4 - Edge Compounding | 2 - Not Edge Compounding | 4 - Not Edge Compounding |
| Highest Belt Life | | 15 hours | 64 hours | 124 hours |

Example 5

Referring to FIG. 4, in another example, the importance of the belt edge notches was demonstrated by testing a belt containing no edge notches, but a smaller edge width (W)= (D+f) of only 11 mm as compared to 25 mm. Both belt edge geometries were operated while processing ground calcium carbonate material, a difficult to fluidize powder, and failed prematurely due to edge deposit compounding. This example illustrates the importance of edge notches to process difficult to fluidize mineral powders. Furthermore edge notches allow for thicker belt edge strands, which increase the resistance to stretching and allow for longer belt operating life prior to stretch failure.

| Feature | FIG. 4 | No Notches - 25 mm Edge Width | No Notches - 11 mm Edge Width |
|---|---|---|---|
| Thickness | t | 3-4 mm | 3-4 mm |
| Edge Width (W) | D + f | 25 mm | 11 mm |
| Solid Width | f | 25 mm | 11 mm |
| Ultimate Belt Failure Mode | | 4 - Edge Compounding | 2 - Edge Compounding |
| Belt Life Average | | 15 hours | 20 hours |

Extensive work has been conducted to determine the optimum notch geometry. In all cases notched edge belts operated significantly longer than straight edge belts, and prevented edge compounding leading to premature belt failure. It should be appreciate that after many hours of operation the belt edge can wear, reducing the notch depth and length. As a result, the geometry of the belt notches can change with time. Therefore, the dimensions provided in the examples are not intended to represent all possible notch dimensions, and that other notch dimensions are possible and are within the scope of the invention.

One newly observed mode of separator belt failure when operating a BSS with a notched edge belt is notch tearing. For notches with a large open area, a narrow, longitudinal strand (f) is created between the inside edge of the notch and first hole opening in the body of the belt. During operation, the edge 49 of the belt is rubbing against either the compacted, abrasive powder that has accumulated on the unswept edges of the separation chamber, or the edges of the separation chamber itself. The edge of the belt rubbing at high velocity creates a shear stress, which stress if it exceeds the yield stress of the narrow longitudinal strand (f) between the inside of the notch and the first hole opening in the body of the belt, will cause the narrow, longitudinal strand (f) to stretch and break. This breaking of the narrow longitudinal strand is facilitated by the flex fatigue of the plastic at the narrowest joint between the notch and the adjacent hole as it is repeatedly flexed up to six times per second as it moves through the tensioning and drive system. The broken longitudinal strand (f) can create "catch" point for the belt on its edge, which will lead to premature belt failure. The tensile strength of the strand can be increased by increasing the thickness (t) of the strand. An alternative solution is to eliminate the narrow strand by omitting or creating a blank (illustrated in FIG. 5A) of the first hole in the body of the belt nearest to the edge notch.

Having thus described certain embodiments of a continuous belt, method of making the same, a separation system using such belt, and a method of separation, various alterations, modifications and improvements will be apparent to those of ordinary skill in the art. Such alterations, variations and improvements are intended to be within the spirit and scope of the application. Accordingly, the foregoing description is by way of example and is not intended to be limiting. The application is limited only as defined in the following claims and the equivalents thereto.

What is claimed is:

1. A belt separator system for separating components of a difficult-to-fluidize material, the belt separator system comprising:
   a first electrode and a second electrode arranged on opposite sides of a longitudinal centerline and configured to provide an electric field between the first and second electrodes;
   a continuous belt having impermeable longitudinal edges of a predefined width and apertures interior to the longitudinal edges that are permeable to the components of the difficult-to-fluidize material, the belt configured for conveying components of the difficult-to-fluidize material under influence of the electric field-in respective counter-current streams along the longitudinal direction between the first and second electrodes; and
   the belt having periodic notches formed within the longitudinal edges at periodic locations in the edge of the belt, the notches being configured for conveying the components of the difficult-to-fluidize material in a direction along the longitudinal direction of the belt separator system.

2. The system of claim 1, wherein the notches formed in the longitudinal edge of the belt have a beveled edge.

3. The system of claim 2, wherein the bevel edge of each notch has a radius in a range of 4-5 mm.

4. The system of claim 1, wherein the notches formed in the longitudinal edge of the belt have a triangular-shape.

5. The system of claim 1, wherein a leading edge of each notch has an angle in a range from 12-45° with respect to the longitudinal edge.

6. The system of claim 1, wherein a trailing edge of each notch is perpendicular with respect to the longitudinal edge.

7. The system of claim 1, wherein the belt includes countercurrent belt segments traveling in opposite directions along the longitudinal direction.

8. The system of claim 1, wherein the notches in the longitudinal edges have dimensions selected to maximize throughput of the belt separator system for a difficult-to-fluidize material.

9. The system of claim 1, wherein each notch in the longitudinal edge has dimensions selected to maximize an operating lifetime of the belt for a difficult-to-fluidize material.

10. The system of claim 1, wherein the belt has a width a few mm short of a width of the inside of the belt separator system and the edges in the longitudinal edges of the belt are configured to sweep components of the difficult-to-fluidize material away from the inside edge of the separation system.

* * * * *